United States Patent [19]
Hadni et al.

[11] 3,741,658
[45] June 26, 1973

[54] SPECTROMETER FOR THE FAR INFRARED

[75] Inventors: Armand Hadni, Nancy; Robert Thomas, Saint-Die; Jacques Weber, Verdun, all of France

[73] Assignee: Agence Nationale De Valorisation De La Recherche (Anvar), Paris, France

[22] Filed: Sept. 21, 1970

[21] Appl. No.: 73,869

Related U.S. Application Data

[63] Continuation-in-part of Ser. No. 761,997, Sept. 24, 1968, Pat. No. 3,619,063.

[30] Foreign Application Priority Data

Sept. 24, 1968  France ............................ 68761997
Sept. 22, 1969  France ............................ 6932159

[52] U.S. Cl. .............. 356/106 S, 346/108, 356/51
[51] Int. Cl. .............................................. G01b 9/02
[58] Field of Search ........................... 346/108, 138; 356/74, 106 S, 51

[56] References Cited
UNITED STATES PATENTS

| | | | |
|---|---|---|---|
| 3,023,664 | 3/1962 | Coleman et al................. | 346/138 X |
| 2,493,534 | 1/1950 | Hawkins....................... | 250/219 UX |
| 3,286,582 | 11/1966 | Mertz ............................. | 356/106 S |
| 3,619,063 | 11/1971 | Hadni............................. | 356/106 S |

OTHER PUBLICATIONS

"Review of Scientific Instruments", Vol. 32 No. 10, October, 1961, pg. 1,163.

*Primary Examiner*—Ronald L. Wibert
*Assistant Examiner*—V. P. McGraw
*Attorney*—William D. Stokes

[57] ABSTRACT

It enables a recording and a reading of interferograms at very different speeds. It comprises an interferometer, a recording mean, a reading means and a wave analyzer. The recording means produce on a support an area of aspect different from the aspect of the support, this area having a contour which reproduces the interferogram supplied by the interferometer. The reading means deliver, for each reading of the support, a signal representative of the transverse dimension of a part of the area whose variations reproduce the variations of the interferogram. To read the recording, there may be provided apodization means multiplying the signals delivered by the photo-electric cell; an eccentric opaque disc cooperates with a light source and a photo-electric cell, the apodization being done electronically in the unit. The invention enables very precise measurements in the far infrared.

14 Claims, 15 Drawing Figures

SPECTROMETER FOR THE FAR INFRARED

This application is a continuation-in-part of application Ser. No. 761,997 filed 24th Sept. 1968, now U.S. Pat. No. 3,619,063.

This invention relates to spectrometers of the type intended for the study of far infrared radiation, that is to say of submillimetric radiation whose wave lengths are comprised between 50 and 1,000 $\mu$, to an assembly therefor and to a method for the measurement thereof.

It is known that spectroscopy in the far infrared has been handicapped from its origins by the lack of brilliant sources and of sensitive receivers. This problem is resolved in a known manner by a better use of the spectral energy of the source thanks to an interferometer such as the Michelson interferometer which, in order to produce an interference phenomenon, divides the light coming from the source into two beams, and sends these two beams which contain practically all the energy of the source to a single point where the receiver is disposed. Thus, all the spectral energy of the source is transmitted to the receiver, which is not the case with a spectrometer applying the principle of diffraction by a diffracting grating, the different frequencies then corresponding to beams separated in space, which must be analyzed one by one.

Figure 2:
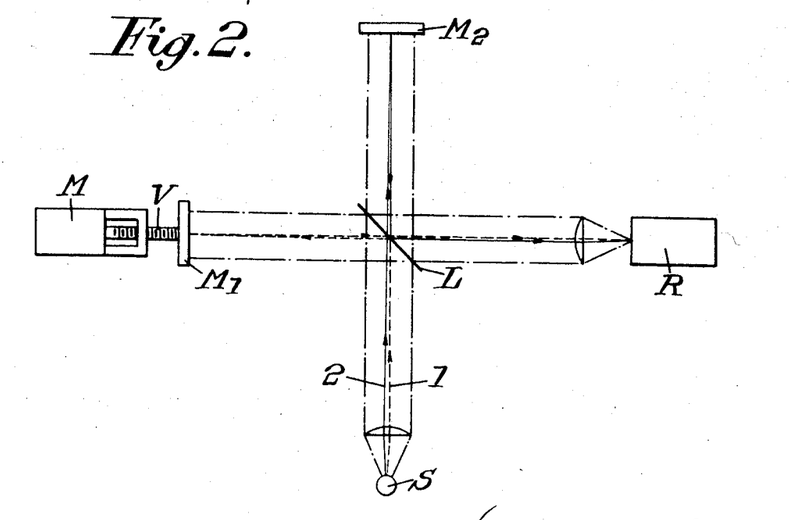
FIG. 2 represents schematically a Michelson interferometer used in this spectrometer.

In order to specify the problems posed by the use of a Michelson interferometer, such an interferometer — shown schematically in FIG. 2 — will now be succinctly described. It comprises a source S, a receiver R, a fixed mirror $M_2$, a semi-reflecting plate L and a mirror $M_1$ which can be displaced along a direction normal to its reflecting surface by the action of a micrometric screw V driven in an appropriate manner by a motor M. Assuming that the source S is monochromatic, it can be seen that, in accordance with the known properties of the semireflecting plate L, a ray coming from the source S can follow the paths 1 or 2, indicated respectively in dashed lines and in solid lines, before reaching the receiver R.

When the mirror $M_1$ effects its movement of translation, the difference of length between the two paths 1 and 2 varies and there is thus produced at the level of the receiver R an interference phenomenon between the beams which follow the paths 1 and 2. These beams generate a luminous flux on the receiver R which measures the intensity and the frequency of this flux and supplies an electric signal (called flux signal in the rest of this text) of the same frequency as the frequency of the modulation of the flux and whose amplitude is proportional to the intensity of the flux.

If $\lambda$ is the wave length of the radiation emitted by the source S, and $v$ the speed of displacement of the mirror $M_1$, the period of the luminous flux received by the receiver R will be, as shown by a simple calculation, $T = \lambda/2v$; this period is thus, regardless of the value of $\lambda$, proportional to the period of the radiation which is $T_R = \lambda/c$ ($c$ = the speed of light). The intensity of the luminous flux will be itself proportional to the brightness of the source S for the radiation $\lambda$ considered.

When the source S is polychromatic, the radiation of each frequency that it emits generates a luminous flux on the receiver R during the displacement of the mirror $M_1$, the intensities and the frequencies of modulation of these fluxes being respectively proportional to the brightnesses of the source S for the different radiation frequencies that it emits and to these frequencies. The superposition of the flux signals corresponding to the fluxes received and measured during the displacement of the mirror $M_1$ by the receiver R creates what is called in the rest of the text an interferogram whose analysis permits the determination of the brightness of the source S corresponding to each frequency of the radiation that it emits, which constitutes the emission spectrum of the source S. Needless to say, if the radiation emitted by the source S passed first through a sample substance disposed in a measuring chamber (not shown) before reaching the receiver R, the analysis of the interferogram supplied by this receiver would constitute an absorption spectrum.

One method of analysis of interferograms uses the Fourier transformation. Each point of the spectrum must be calculated and it is thus necessary to have a calculator available, which renders this method expensive and not very practical.

Another method would be to record the interferogram on a magnetic tape and to analyze the interferogram, repeated with an appropriate frequency, by a wave analyzer. However, the speeds of recording and of reading of the tape differ so much that this method is difficult to apply. Indeed, in view of the low energy of the waves in the far infrared, the interferogram is recorded at a very low speed (this recording can last an hour for example) and, in order to analyze conveniently this interferogram in a few minutes, the wave analyzer must read it at least twenty times per second. In these conditions, the ratio of the speeds of recording and of reading is about 72,000. Furthermore, the tape on which the interferogram is recorded must have, for technical reasons, a length such that its driven speed becomes considerable if it is passed 20 times per second across a reading head.

The chief object of this invention is to provide, for use in combination with an interferometer adapted to supply an interferogram and a wave analyzer adapted to analyze a periodic signal, an assembly formed of recording means adapted to record the interferogram and of reading means adapted to read repetitively this recording, the assembly being such that the spectrometers thus constituted fulfil the requirements of practice.

The invention comprises, principally, the provision for the assembly mentioned above, of recording means adapted to produce on a support a modified area or area of aspect different from the aspect of the support and of which a part of the contour reproduces the curve representing the complete interferogram and of reading means adapted to deliver, for each reading of the moving support, a signal representative of the dimension transverse with respect to the movement of the support of a part of the modified area having a transverse dimension whose variations reproduce the variations of the amplitude of the interferogram.

In any case, the invention will be well understood from the following complementary description as well as from the accompanying drawings, relating to several embodiments, which complementary description and drawings are, of course, given merely by way of example.

The spectrometer which will now be described is intended for the study of a source emitting radiation in the far infrared.

With regard to the spectrometer as a whole, it comprises (FIG. 1) an interferometer 5 (such as a Michelson interferometer) whose receiver R (such as a pyroelectric receiver described in the Journal de Physique, tome 26, June, 1965, p. 345) is adapted to supply an electric signal constituting the interferogram of a source S of radiation, this radiation coming to the receiver R either directly or through a measuring chamber 6 adapted to receive a substance whose properties in the far infrared are to be studied. The spectrometer further comprises an assembly formed of recording means adapted to record the interferogram and of reading means adapted to read repetitively the recording. The spectrometer comprises in addition a wave analyzer 8 adapted to analyze the repetitive signal supplied by the reading means mentioned above in order to extract from this signal components which each correspond in amplitude and in frequency to radiation of a given frequency emitted by the source S.

Figure 1:
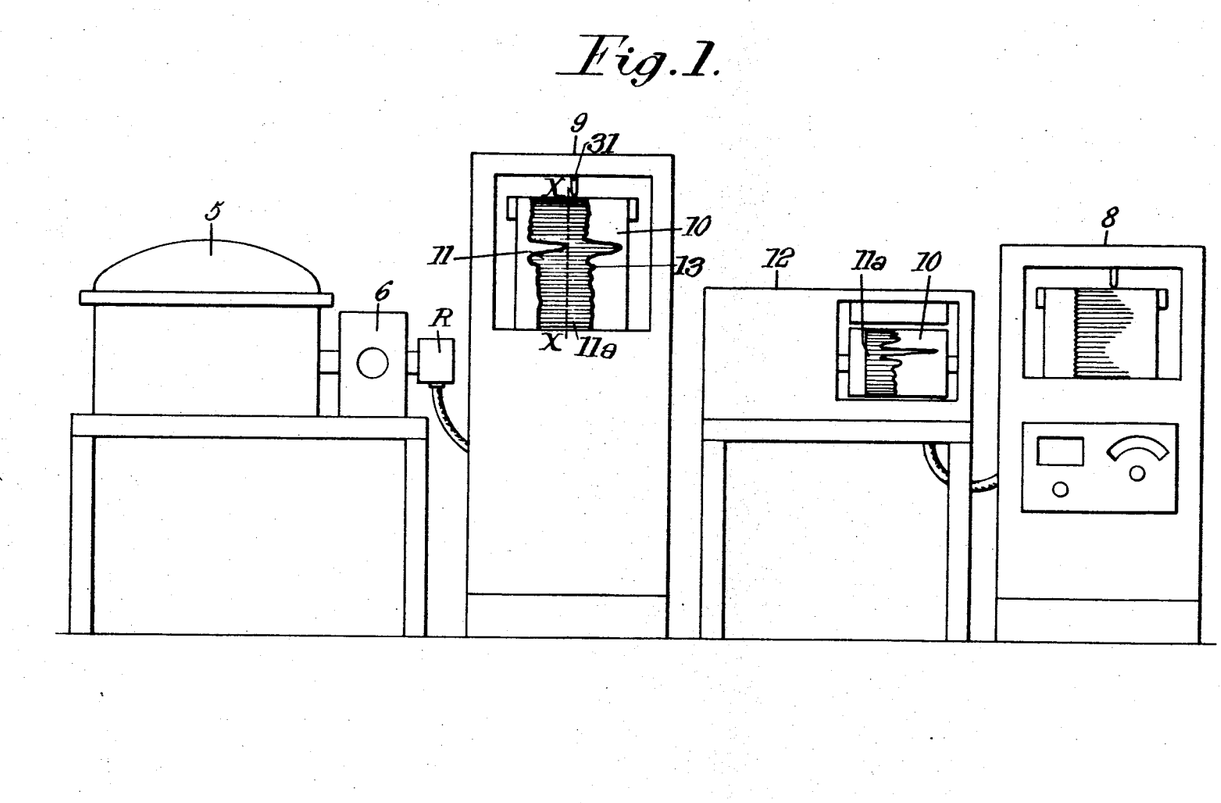
FIG. 1 represents schematically a spectrometer according to the invention.

According to this invention, there are provided, for the assembly mentioned above, recording means 9 producing on a support 10 and of which a part 13 of the contour reproduces the curve representing the complete interferogram and reading means 12 delivering, for each reading of the moving support 10, a signal representative of the dimension transverse with respect to the movement of the support 10 of a part 11a of the modified area 11 having a transverse dimension whose variations reproduce the variations of the amplitude of the interferogram.

For example, the recording means 9 comprise a conventional pen recorder in which can advance a support 10 constituted by a band and with which are associated means adapted to superimpose a periodic signal on the interferogram coming from the receiver R thus forming a resultant signal which is sent to the recorder 9 and which serves to make the pen 31 trace on the band 10 the modified area or area 11 of different aspect, the amplitude of the periodic signal being greater than the maximum amplitude of the interferogram and the frequency of this periodic signal being sufficient to ensure a saturated darkening of the area 11 when the band 10 advances in the recorder 9.

Figure 3:
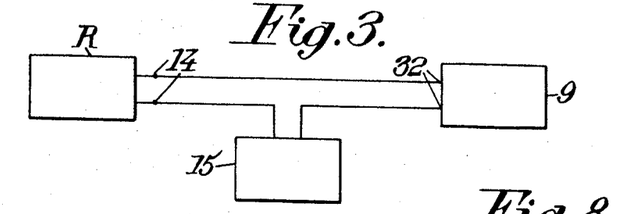
FIG. 3 shows a device forming part of this spectrometer.

The means for superimposing a periodic signal on the interferogram advantageously comprise a saw tooth voltage generator 15 (FIG. 3) which is connected in series between the output 14 of the receiver R and the input 32 of the pen recorder 9.

Figure 4:
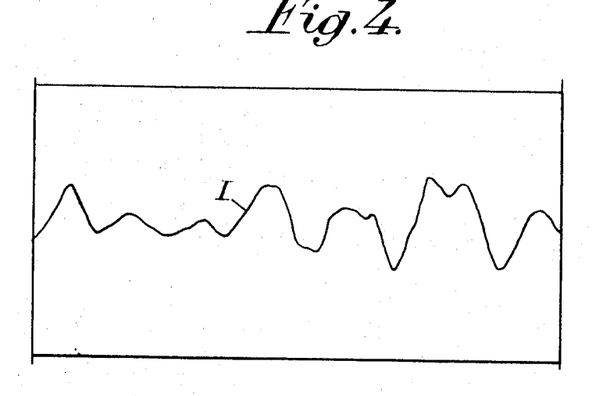
FIGS. 4, 5 and 6 illustrate the use of the device of FIG. 3.
Figure 5:
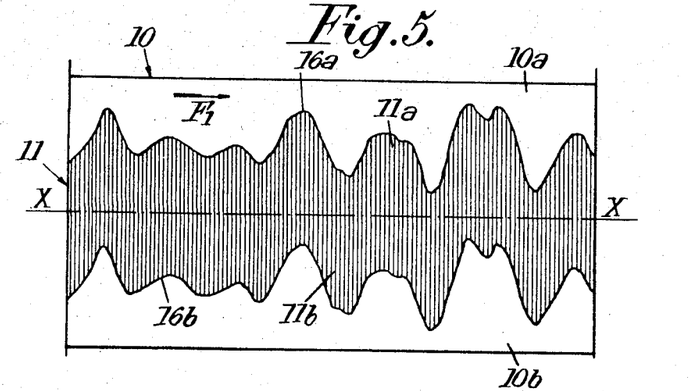

If a signal I (FIG. 4) is present at the output 14 of the receiver R, the resultant signal which is present at the input 32 of the recorder 9 is represented on a band 10 advancing in the recorder 9, in the manner which is shown in FIG. 5. The total darkened area 11 which is disposed on the band 10 is comprised between two lines 16a and 16b each reproducing the signal I, and the distance (measured along a direction perpendicular to the direction of the arrow $F_1$ which indicates the direction of movement of the band 10 in the recorder 9) between these two lines 16a and 16b is equal at each instant to the amplitude of the saw tooth voltage.

It is seen that a partial darkened area 11a bounded on the band 10 by the line 16a and by a line X—X (in dashed lines) passing, parallel to the direction $F_1$, through the darkened area 11 so that it does not in any case pass through a non-darkened surface of the band 10, has a dimension transverse with respect to the direction $F_1$ whose variations reproduce the variations of the amplitude of the signal I.

When the signal I is constituted by the interferogram supplied by the receiver R, the part 10a of the band 10 which is bounded by a line X—X receives a darkened area 11a (FIG. 6) bounded by the line X—X and by a line 16a similar to the interferogram, the variations of the transverse dimension of this darkened area 11a, transverse with respect to the direction of displacement $F_1$ of the band 10, reproducing the variations of the amplitude of the interferogram.

Figure 6:
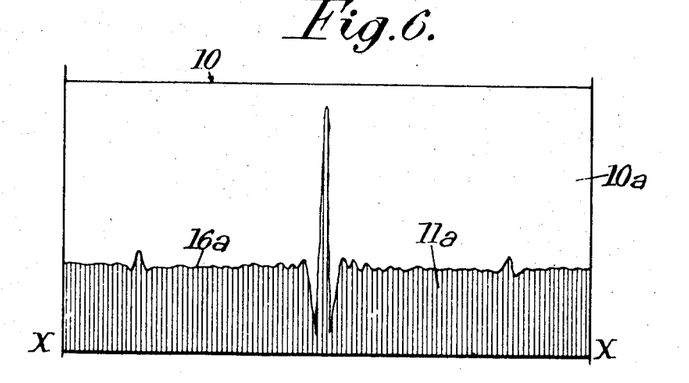
Figure 7:
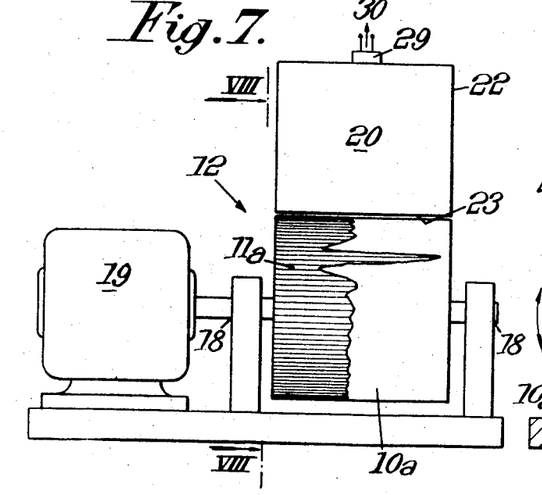
FIG. 7 shows schematically an embodiment of the reading means forming part of the spectrometer.
Figure 8:
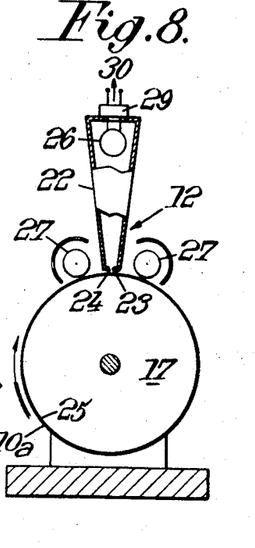
FIG. 8 shows schematically, in section along VIII—VIII of FIG. 7, these same reading means.

Next, with regard to reading means 12, one embodiment of these reading means 12 is shown schematically in FIGS. 7 and 8. These means 12 advantageously comprise a rotary drum 17 mounted on bearings 18, and driven by a motor 19 which can advantageously be a synchronous electric motor. The reading means 12 further comprise a reading member 20 constituted by a closed casing 22 having a face 23 which is nevertheless provided with a slot 24, this casing 22 containing a photoelectric cell 26. The casing 22 is disposed with respect to the drum 17, so that its face 23 is very near to the peripheral surface 25 of the drum 17 and so that the slot 24 is directed along a direction parallel to the axis of rotation of the drum 17. The peripheral surface 25 is such that it can receive the part 10 a of the band 10 which is represented in FIG. 6, so that this part 10a covers advantageously all the peripheral surface 25 and so that its width is substantially equal to the length of the slot 24.

The photoelectric cell 26 is advantageously placed in a part of the casing 22 remote from the face 23 and from the slot 24 of the casing. On opposite sides of the casing 22, near to the slot 24 and parallel to the axis of rotation of the drum 17, are disposed lamps 27 intended to light the part 10a of the band 10 at the moment when it passes under the slot 24.

The photoelectric cell 26 measures at each instant the quantity of light reflected by the part 10a of the band 10 passing in front of the slot 24 of the casing 22. This quantity of light is in direct relation with the width of the darkened area 11a, present under the slot 24, at the instant considered and the photoelectric cell 26 thus supplies at each revolution of the drum 17, an electric signal whose variations reproduce the variations of the amplitude of the interferogram supplied by the receiver R.

Since the drum 17 is driven with a uniform rotation movement, this signal is repeated with a constant frequency equal to the frequency of rotation of the drum 17 and is advantageously sent into an amplifier 29 which thus delivers a periodic voltage 30.

A variant (not shown) of the system described above uses the two bands 10a and 10b that can be obtained by cutting the single band 10 supplied by the recorder 9, along a line X—X (FIG. 5). To each band 10a or 10b corresponds a casing 22 provided with a slot 24 and containing a photoelectric cell 26. A rotary drum 17 advantageously carries on its peripheral surface the two bands 10a and 10b disposed one beside the other. The two photoelectric cells 26 deliver two voltages in phase opposition which are applied to the inputs of a differential amplifier whose output supplies, at each revolution of the drum 17, a voltage having the shape of the interferogram, independently of any inequalities of darkening which the darkened areas 11a and 11b of the bands 10a and 10b might present.

Figure 9:
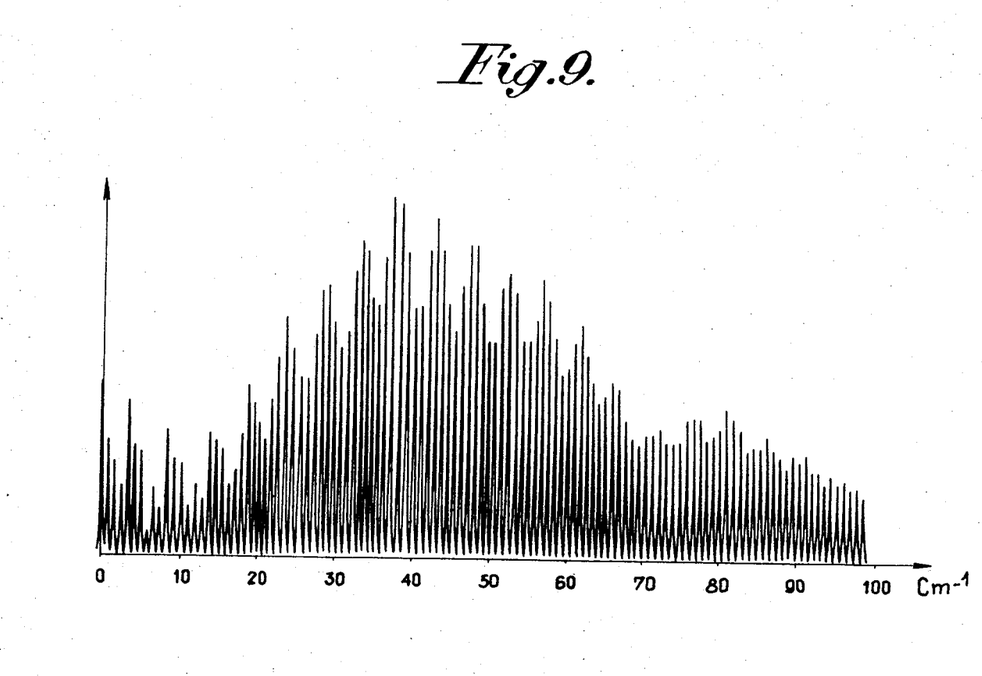
FIG. 9 shows an example of a spectrum supplied by the spectrometer according to the invention.

The periodic voltage 30 supplied by the reading device 12 thus reproduces the interferogram repeated at a given frequency, depending on the speed of rotation of the drum 17. This periodic voltage 30 is sent to a wave analyzer 8 whose function is to extract the flux signals which constitute the components of this periodic voltage and which each correspond to a flux received by the receiver R. Since each of these fluxes corresponds to radiation of a given frequency coming through the Michelson interferometer 5 from the source S, either directly, or after having passed through a substance introduced into the measuring chamber 6, it is seen that the wave analyzer 8 determines from the periodic voltage the spectrum sought, such as the one which is shown in FIG. 9, the wave lengths of the radiation of the various frequencies being shown on the abscissa (in number of waves per centimeter) and the corresponding brightnesses being shown on the ordinate.

The scales employed in this latter figure depend on the speed of displacement of the movable mirror $M_1$, on the speeds of advance of the band 10 during recording and reading and on the sensitivity of the receiver R. The movements of the mirror $M_1$ and of the band 10 in the recorder 9 and in the reading means 12 are advantageously controlled by synchronous motors which possess a high regularity of operation. Similarly, the exploration by the wave analyzer 8 of the periodic voltage 30 coming from the reading device can advantageously be controlled by a synchronous motor.

The operation of a spectrometer according to this invention is sufficiently apparent from the foregoing that no further explanation is necessary in this connection.

This spectrometer presents numerous advantages:
the cost price is relatively low;
the recording is slow and the reading is very rapid for it only depends on the speed of rotation of the drum 17;
the rapid reading permits the spectrum sought to be obtained in times much shorter than those which are usually required by spectrometers for infrared;
the limit of resolution is less than 1 cm$^{-1}$;
the use of a pyroelectric receiver renders the spectrometer robust and reliable.

Many variants or modified versions of the particular spectrometer described are possible. In one such variant, the darkening system described above is applied not to a band but to a disc fixed on a plate making one revolution during the duration of recording of the interferogram, the pen of the recorder then moving along a radial direction. For the reading, the disc transported to another plate turning at high speed is lit and excites by reflection a photoelectric cell.

In another variant of the spectrometer, the reading is no longer realized by reflection of the light on a band or a disc, but by transmission of the light through this disc or band, the light source and the photoelectric cell being placed respectively on opposite sides of the support used.

A variant of the darkening system to form the modified area uses a photographic emulsion disposed on a support in the form of a band or disc, the variable height darkening being produced, for example, by forming on the emulsion the image of a luminous slot whose height varies in the same manner as the intensity of the interferogram, the reading being done by reflection, as described above, or by transmission if the support is transparent.

If the recording on a band wound on a drum is less precise, required additional operations to obtain the actuating signal of the stylus or of the height of the slit and has a less easy relationship between the two ends of the recording, the application of a disc with recording in polar coordinates (in place of cartesian coordinates in the deployed band) avoids these drawbacks.

In addition, although darkening by means of an inked stylus requires either an enormous ink reservoir or frequent renewal of the ink reserve in a reservoir of normal size, recording on a photographic emulsion avoids this drawback.

However, the application of the method according to the invention, even with recording on an opaque disc coated with a photographic emulsion by means of a slit of variable height, has drawbacks, especially due to the fact of the poor relationship between the ends of the recording, and limited precision and sensitivity due to possible bad alignment of the recording, to the irregularity of the darkening resulting from the variation of the characteristics of the lamps and of the photoelectric recording and reading cells on the photographic emulsion.

By means of a further feature of the spectrometer and method according to the invention, these disadvantages can be avoided, and it is possible to eliminate, or at least to minimize, the errors of alignment and the irregularities of darkening.

According to this further feature of the invention, the spectrometer comprises a Michelson interferometer provided with a receiver which converts the interferogram produced in the interferometer into an electrical signal of amplitude proportional to the luminous intensity of the interferogram, a recording device adapted to trace on a disc rotating at a first constant speed, a recorded surface whose distance to the center is a linear function of the amplitude of the said electrical signal, the period of rotary movement of the disc being equal to the duration of transmission of the complete interferogram in the form of the electrical signal, a reading device analyzing periodically the distance to the center of the said recorded surface on the rotating disc at a second constant speed much greater than that of the first constant speed, by providing a periodic succession of electrical signals each representative of the interferogram, and a wave analyzer receiving the said periodic succession and extracting from the latter the infrared spectral components, characterized by the fact that the reading device comprises apodisation means effecting the multiplication of the periodic succession of signal by an apodisation signal itself periodic which decreases from the value unity for a central peak of the interferogram to the value nil at the connecting ends of successive interferograms, which ensures a reduction of the secondary lobes of the function of the apparatus and a reduction of the interfering spectrum caused by a possible derivative of the electrical signal during its recording in the recording device.

Preferably, the spectrometer comprises means for eliminating a certain proportion of successive interferograms sent in the form of a periodic succession of signals to the wave analyzer, so as to increase the number of separate spectral lines defining the infrared spectrum, which facilitates the continuous tracing of the spectrum in automatic manner.

In order to eliminate certain disturbances, the spectrometer can include in its preferred embodiment a second reading device capable of analyzing a reference interferogram previously recorded by the recorder on a second disc, the two discs of the two reading devices rotating in synchronism, and a wave analyzer with two paths controlled by a single heterodyne oscillator to preserve perfect equality of the analysis frequencies, the outputs of the two paths being applied on a connecting recorder or on a divider followed by a conventional recorder.

Finally, in one preferred embodiment — in which the recording takes place on a photographic emulsion borne by an opaque support, especially on a "Polaroid" positive, on paper, of the flat-film type, by means of a slit of length variable as a function of the electrical signal discharged by the receiver of the interferometer and of a first light source, and the reading by reflection of a second light source on the recorded "Polaroid" disc — to maintain constant in time the ratio between the said electrical signal and the radial elongation of the photographic darkening, in spite of the variations of the light sources and of the darkening produced, the spectrometer can comprise means associated with the reading device to analyze, on a recording, equal areas successively darkened and not darkened and by deducting a possible correction signal therefrom.

Figure 10:
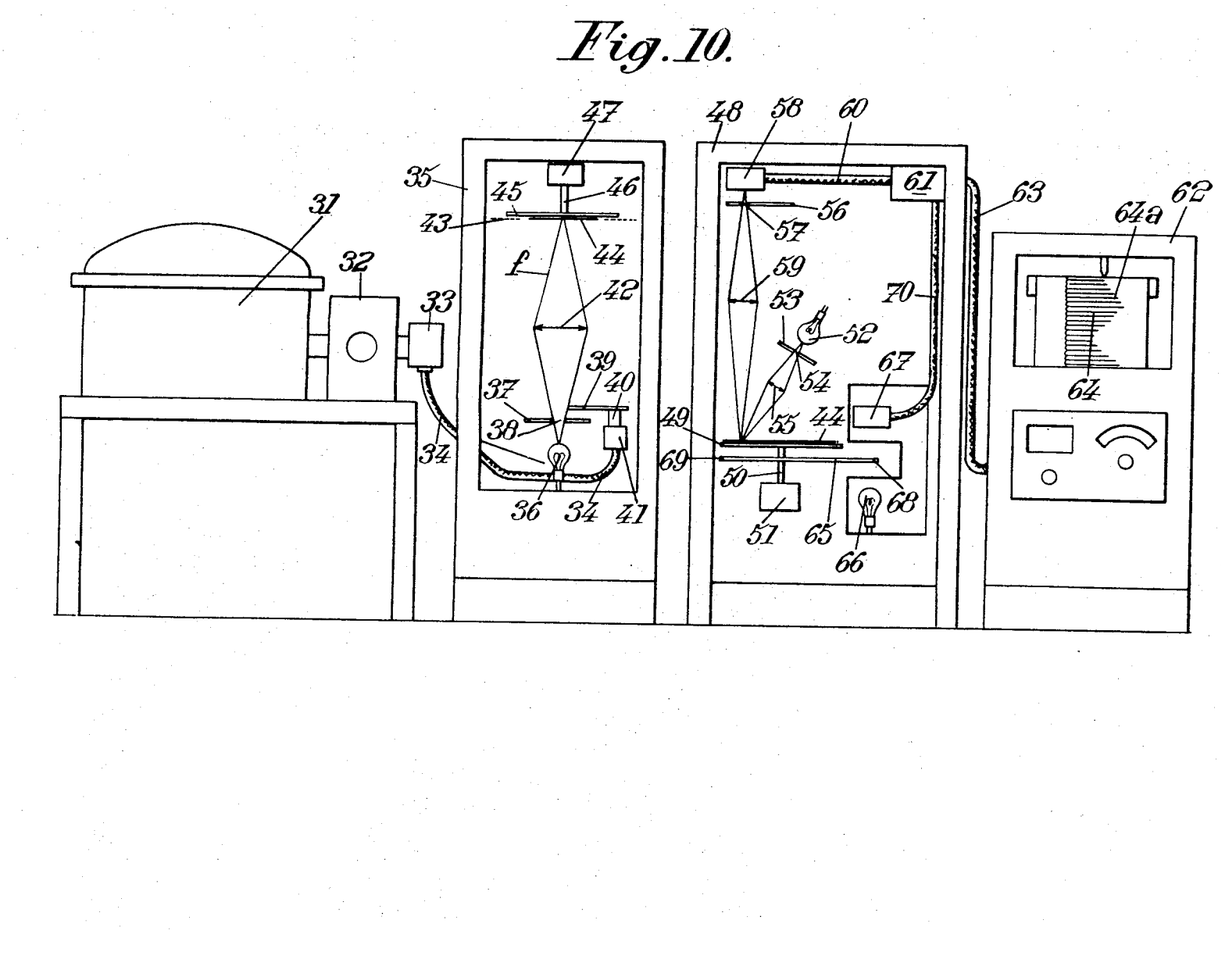
FIG. 10, of these drawings, shows diagrammatically the assembly of a spectrometer according to the invention.

As shown in FIG. 10, the spectrometer comprises firstly an interferometer of the Michelson type 31 described in the U.S. Pat. No. 1,545,794 above-mentioned with a measuring chamber 32 (possibly provided with a cryostat), adapted to receive a sample of which it is desired to study the transmission properties in the far infrared, and a receiver 33 (for example of the Golay type or of the pyroelectric type) of which the sensitive surfaces receives the luminous flux from the interferometer which form on it the optical interferogram, this receiver delivering through the conductor 34 a voltage $e$ of which the amplitude is proportional to the infrared intensity received by it, this voltage $e$ thus reproducing faithfully the variations of infrared intensity.

Figures 11, 12:
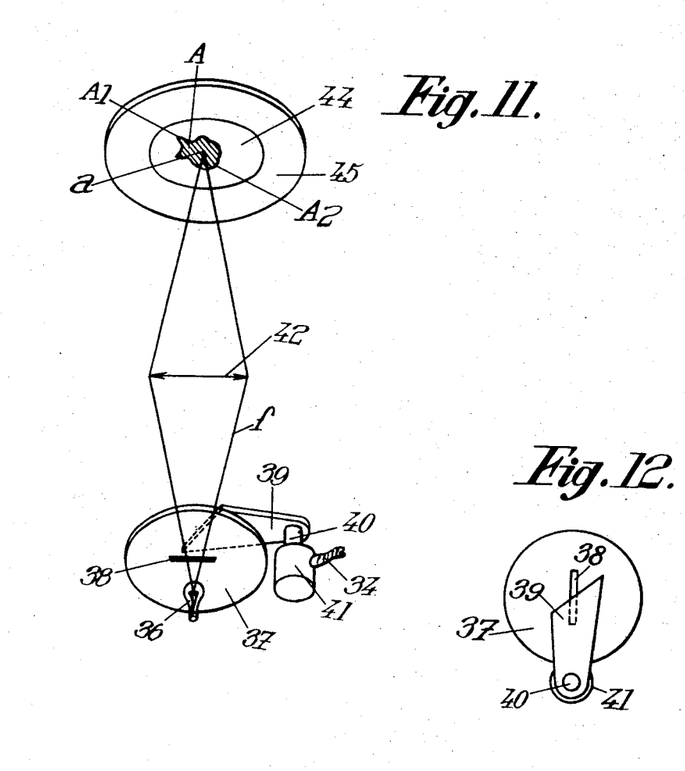
FIG. 11 illustrates in perspective the recording device of the spectrometer of FIG. 10.
FIG. 12 shows, in plan view, the slit and the movable flap of the recording device of FIG. 11.

The spectrometer comprises further a recorder 35 (illustrated separately in FIG. 11) which includes in a preferred embodiment:

a source of light or lamp 36 of as constant a luminous intensity as possible;

an opaque plate 37 pierced by a slit 38;

an opaque shutter 39 mounted to be rotatable, with its axle 40 rotated by a galvanometer 41 receiving, through the conductor 34, the voltage $e$, the angle of rotation of this shutter 39 (from its resting position) being proportional to $e$; as seen in FIG. 11, and particularly in FIG. 12, the opaque shutter 39 has a bevelled free end, so as to intercept a larger or smaller portion of the luminous beam coming from the source 36, and passing through the slit 38, according to its angle of rotation, the length of the slit uncovered by the shutter 39 and hence the width of the luminous beam $f$ passing through the slit 38 and not arrested by the shutter 39 being, by construction, proportional to $e$; (there can of course be provided other means to ensure the variation of the length of the slit, as a function of $e$, than the shutter 39);

a lens 42 which forms the image of the slit 38, more or less obturated by the shutter 39, in a plane 43;

an emulsion or photographic support 44 in the form of a disc borne in this plane 43 by a plate 45 whose axle 46 is rotated by the electric motor 47 (in a variation the plate 45 could be movable and the plate 37 turn around its axle), this emulsion 44 being advantageously constituted by a Polaroid positive flat-film (instead of rotating the emulsion or photographic support, rotation of the lamp, slit and slit-length variation device can be provided).

There is thus obtained a bleached recording (when a positive is used) A (hatched in FIG. 11) in the form of an irregular circular surface around the point $a$ where the optical axis of the system cuts the plane 43, this recording or diagram representing, in polar coordinates, an interferogram when the plate 45 makes a complete revolution during the duration of the reception of a complete interferogram by the receiver 33, which is provided by construction, the variable length of the vector radius or module being proportional to the width of the beam $f$, hence to $e$, whilst the angle at the center from a vector ray or argument is proportional to the time of analysis of the interferogram.

Figure 13:
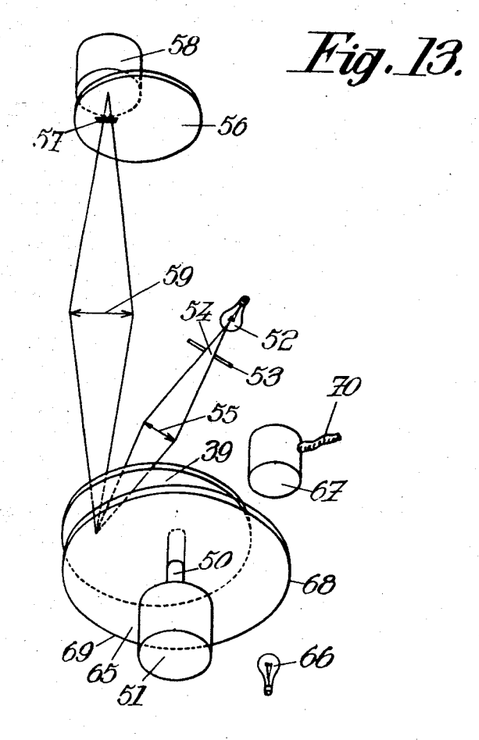
FIG. 13 illustrates in perspective the reading device of the spectrometer of FIG. 10.

The spectrometer comprises also a reading device 48 (illustrated separately in FIG. 13) which includes:

a plate 49 whose axle 50 is driven by a motor 51 in rotation at a speed much greater than that of the plate 45, this plate 49 receiving on its upper surface a recording 44;

a source of light 52, a plate 53 pierced by a slit 54 and a lens 55 to illuminate a radial strip of the recording 44 borne by the plate 49;

a plate 56 pierced by a fine slit 57;

a photoelectric cell 58;

a lens 59 to project on the sensitive surface of the cell 58 (through the slit 57) the illuminated strip of the recording.

Through this arrangement, the cell 58 receives a luminous intensity whose variations follow faithfully the variations of the radial length of the recording A, hence of $e$, that is to say of the luminous intensity received by the receiver 33. The output voltage $e1$ of the cell 58, proportional hence to $e$, is led by a conductor 60 into an electronic processing assembly 61 which will be described below with reference to FIG. 14.

The spectrometer comprises lastly a wave analyzer 62, connected by a conductor 63 at the output of the electronic unit 61, this wave analyzer being of conventional type and producing, from the voltage e1 suitably modified in the assembly 59, a spectrum of infrared rays 64a illustrated at 64; the wave lengths of the various infrared variations being borne along the horizontal axis and the corresponding luminances along the vertical axis (when FIG. 10 is considered).

According to another feature of the invention, the reading device 48 comprises apodisation means enabling the interferogram to be multiplied by a function decreasing progressively from 1 at the level of the central peak A1 of the diagram A (FIG. 11) representing the interferogram in polar coordinates to 0 at the connecting ends A2 on the vector radius of origin. Such an apodisation is advantageous since it enables the importance of the secondary lobes of the function of the apparatus to be lessened and the interfering spectrum due to a possible derivative of the electrical signal e and/or the intensity of the luminous beam f resulting during the recording to be reduced, which derivative would have the effect of producing, in the absence of apodisation, a scale at the connection at A2 of the diagram in polar coordinates (see FIG. 15, first curve, illustrating e1), the modulus being no more exactly the same at the initial end and at the final end of the recording which are superposed at A2.

Figure 14:
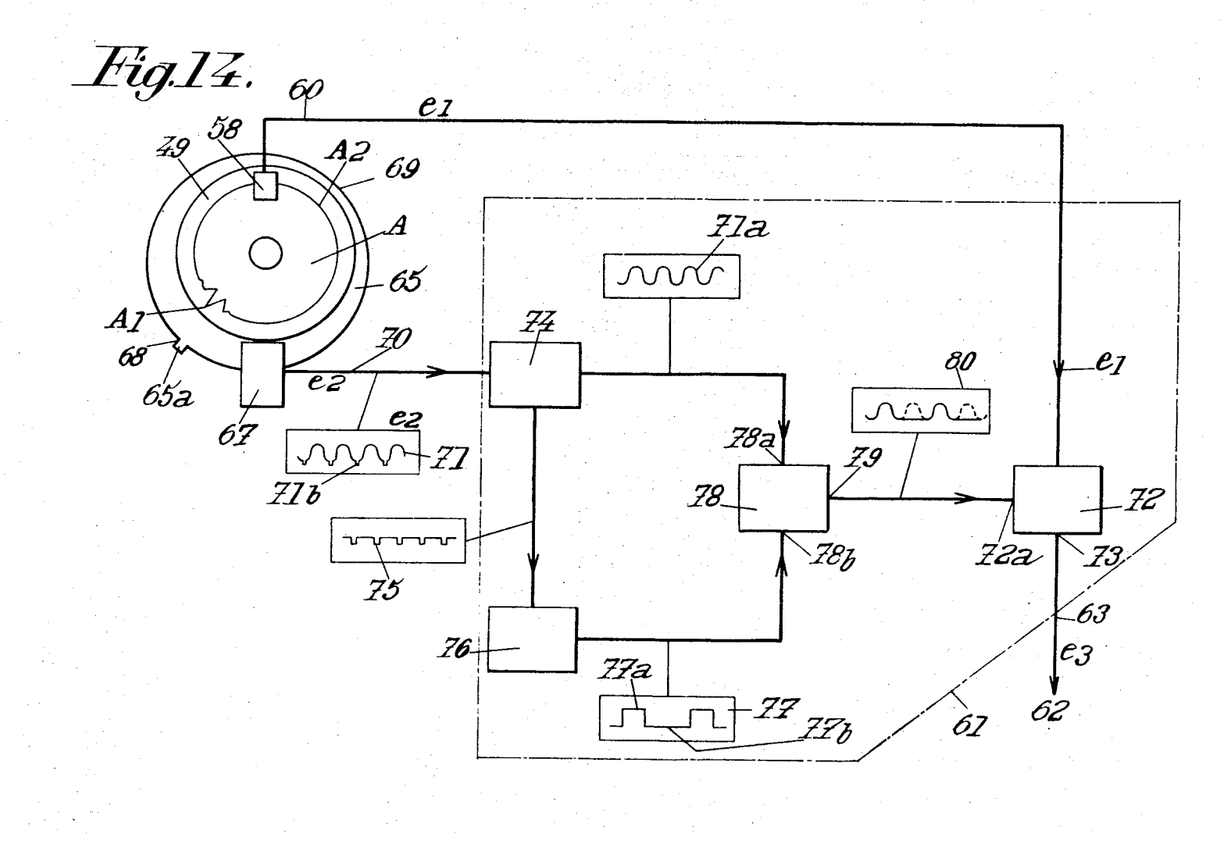
FIG. 14 shows, in the form of functional blocks, the electronic assembly associated with the reading device of FIG. 13 to produce the apodisation and elimination of a fraction of the interferograms.

The apodisation means can be constituted advantageously, as illustrated in FIGS. 10, 13 and 14, by an eccentric opaque disc 65 borne like the plate 49 by the axle 50 and thus turning at the same speed as the plate 49. This eccentric disc cooperates with a source of light 66 and a photoelectric cell 67 arranged on both sides of the disc 65, so that the cell 67 receives from the source 66 a luminous intensity which varies from an intensity nil, when the elongated portion 68 of the disc 65 passes between the source 66 and the cell 67 (position shown in FIGS. 10 and 13), to a maximal intensity, when the non-elongated portion 69 of the disc 65 comes to face the source system 66-cell 67 obturating not at all or very partially the light sent by the source 66 onto the cell 67. This variable luminous intensity is translated by the cell 67 into an electrical signal e2 whose amplitude varies also periodically between a value nil and a maximal value, the frequency of this periodic signal being equal to the frequency of the rotation of the disc 65 and of the plate 49. The signal e2 is transmitted by a conductor 70 to the electronic assembly 61. The voltage e2 delivered by the cell 67 has substantially the shape of a sinusoid, as illustrated in FIG. 14, whilst neglecting for the moment the notches 71b occurring on the sinusoid 71 of FIG. 14. This sinusoidal voltage actuates, through a field effect transistor provided in an amplifier 72, the voltage gain e1 arriving in the same amplifier. There is thus obtained at the output 73 of the amplifier 72 a signal which has undergone apodisation, which signal is finally transmitted by the conductor 63 to the wave analyzer 62. The form of the disc 65 can be selected to obtain any desired form of apodisation.

The spectrum supplied by the wave analyzer 62, on repetitive reading of the diagram A in the reading device 48, is constituted, as seen at 64 of FIG. 10, by rays 64a separated by an interval which is the inverse of the optical field corresponding to the whole interferogram (that is to say a rotation of 360° on the flat-film in polar coordinates). Although containing all information, the spectrum 64 does not allow a suitable tracing, especially automatic, of the casing of these rays.

In order to increase the number of rays defining a spectrum, the suppression periodically of $m$ readings in $n$ is contemplated, for example by eliminating one reading in two or three readings in four. When $(n-1)$ readings in $n$ are eliminated, the fundamental frequency of the function obtained is divided by $n$, whilst the number of rays 34a defining the spectrum is multiplied by $n$.

In the embodiment illustrated in FIG. 14, the periodic effacing of certain readings is obtained by providing on the disc 65, in the region 69 corresponding to maximal apodisation, that is to say at the fused ends of the interferogram, a crenel 65a which adds on each revolution of the disc 65 a top 71b to the apodisation signal 71. This top, which does not act directly on the signal e1 in the amplifier 72, since it appears at the moment of 0 gain, is separated, in a separator 74, from the sinusoidal apodisation signal 71a. The separate tops 75 synchronize a multivibrator 76 of which the states 0 and 1 have durations equal respectively to one reading $(n-1)$ readings when it is desired to eliminate $(n-1)$ readings on $n$. At 77 there is illustrated the output signal of the multivibrator 76 which includes shoulders 77a having the duration of one reading and bases 77b having the duration of $(n-1)$ readings (for example of one reading also, $n$ being equal to two).

The signals 71a and 77 are mixed in a mixer 78 constituted by a gate which only transmits the signal 71a received at its signal input 78a when its control input 78b receives a crenel 77a. The mixer 48 hence delivers at its output 79a a signal 80 which only includes, when $n=2$, one sinusoid in two with respect to the signal 71a (there is shown in interrupted lines, for the signal 80, the sinusoids eliminated by the mixer or gate 78).

The signal 80, such as illustrated in full lines in FIG. 14 (in the case where certain readings are periodically removed), or the signal 71a (in the absence of elimination of readings, and in this case the assembly of FIG. 14 does not include the units 74, 76 and 78) is applied on the input 72a of the amplifier 72 to modulate, as explained previously, the signal e1 issuing from the cell 58.

The presence of a larger number of rays resulting from the effacement produced by the system which has just been described with reference to FIG. 14 facilitates the continuous tracing of the spectrum; in fact there can be introduced a low-pass filter between the wave analyzer proper and the recorder of the latter without loss of resolution, which would not be the case if there were a single line per spectral element.

Figure 15:
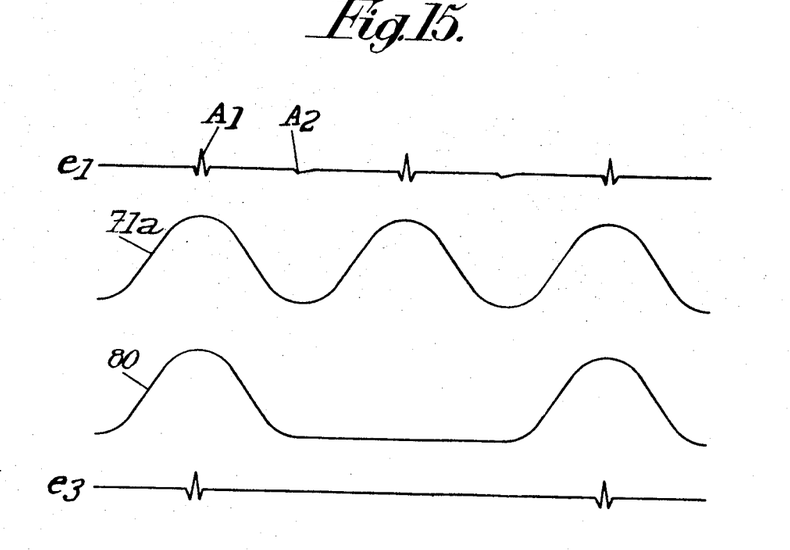
FIG. 15, lastly, shows curves representative of the electrical signals produced in the assembly of FIG. 14.

In FIG. 15, there is shown a certain number of curves facilitating the understanding of the operation of the assembly of FIG. 14. In this Figure, there is shown firstly the repetitive signal e1 reproducing the interferogram with a peak at A1 and a notch at A2. The sinusoid 41a of apodisation is represented under the signal e1. Then there is shown the apodisation signal 80 in which one sinusoid in two was eliminated, so as to eliminate one reading in two. Lastly at the base of FIG. 15 there is shown the signal e1 after apodistaion and elimination of one reading in two: it is the signal e3 delivered by the amplifier 43.

Although the spectrometer which has just been described with reference to FIGS. 10 to 15 gives excellent results due to the fact of the apodisation and enables easy recording of the envelope of the spectrum in the case where it includes means to eliminate a fraction of readings, this spectrometer can also include one or both of the following features:

1. The spectrometer can be provided with means enabling any recorded spectrum to be compared with a previously recorded reference spectrum.

In a further embodiment, there are provided two reading devices and a single wave analyzer, the reading device analyzing first, at a certain frequency, one of the interferograms. The value obtained for this interferogram being preserved in a memory by any method (for example by charging a condenser or the position of a potentiometer), the second reading device reading the second interferogram, the outputs of the second reading device and of the memory being sent into a device forming the ratio between the voltages provided from the second reading device and from the memory. Then the exploration by the wave analyzer is advanced one step to study the following line and the process is followed so as to examine all the lines.

More advantageously, to preserve the advantage of the continuous tracing which is possible in the case where there are provided means for eliminating a certain number of readings, there is provided in the spectrometer, according to another embodiment, not only two reading devices, but also two paths in the wave analyzer, these two paths being controlled by a single heterodyne oscillator to preserve perfect equality between the analysis frequencies in the two paths. In this case the two reading systems rotate in synchronism and feed the two paths of the wave analyzer without resorting to a memory; the two voltages delivered by the two paths of the analyzer feed either a ratio recorder, or a divider followed by a conventional recorder.

In all cases (wave analyzer with one path and the memory or a divider followed by a contentional recorder), there can be effected the comparison of the interferogram of one substance to be studied placed in the measuring chamber 32 with a well known reference interferogram, which is often very useful.

2. For measurements of very great precision, it is advantageous to compensate possible modifications of the light sources and of the photoelectric cells, on one hand, and of the reflecting power of black and white on the photosensitive material, on the other hand. To maintain in time a constant ratio between the value of the electrical signal and the modulus on each vector radius in the diagram A, in spite of the said modifications, there can be included in the spectrometer a disc (not shown) arranged between the cell 58 and the plate 56. This disc not shown includes holes and is rotated around the optical axis (vertical) of the reading device, so as to form a rotary modulator on the path of the light which comes to strike the cell 58. The holes of this disc not shown are arranged so that they uncover alternately one length and hence one well determined area of black, then the same length and the same area of white. The amplitude of the alternating signal delivered by the cell 58, when the plate 49 is arrested and which is made to turn the modulator, represents the gain of the assembly between the black and the white. A corrective potentiometer, also not shown, provided between the cell 58 and the electronic assembly 61 enables this gain to be restored to a fixed constant value, which ensures finally a constant ratio between the electrical signal e1 arriving in the assembly 61 and the radial polar coordinate of the diagram A representing the interferogram.

The spectrometer according to the invention is particularly suitable for analyses of very great precision in the far infrared, with an excellent limiting resolution (less, e.g. than 0.2 cm$^{-1}$). Recording and reading take place at very different speeds.

As is self-evident and as emerges already from the preceding description, the invention is not limited in any way to those of its methods of application, nor to those of its methods of production, of its various parts, which have been more particularly considered; it embraces, on the contrary, all variations.

We claim:

1. An assembly for use in combination with an interferometer for measurement of far infrared radiation, said assembly comprising a receiver arranged to convert the infrared interferogram produced in the interferometer to an electrical signal proportional to the intensity of the interferogram, recording means arranged to record on a surface rotating at a first regular speed a modified area having a parameter which varies as a linear function of the amplitude of the said electrical signal, the period of the rotation of said surface being equal to the duration of the transmission of the complete interferogram in the form of said electrical signal, reading mans arranged to analyze periodically said parameter of said area, said reading means rotating at a second regular speed much greater than said first regular speed, thereby supplying a periodic series of electrical signals each representative of said parameter of a portion of the interferogram, said reading means comprising means for multiplying the periodic series of signals by a periodic apodisation signal having an amplitude which steadily varies from a predetermined value for a central peak of the interferogram to zero at connecting ends of successive interferograms, thereby reducing the effect of drift during recording.

2. A spectrometer for the study of a source emitting radiation in the far infrared, comprising an assembly according to claim 1, in combination with an interferometer adapted to deliver the interferogram of said radiation source and a wave analyzer adapted to analyze said series of signals and to extract components therefrom each corresponding in amplitude and infrequency to radiation of a given frequency from the source.

3. A spectrometer according to claim 2, wherein said surface is in the form of a band, and said recording means comprise a recorder in which said band passes during the delivery of the interferogram, and with which recorder means are associated for adding a periodic signal to the interferogram thus forming a resultant signal which is sent to the recorder and which serves to produce on the band said modified area, the amplitude of the periodic signal being greater than the maximum amplitude of the interferogram, and wherein said reading means comprise a rotary drum forming at least part of said moving means and receiving on its peripheral surface a part of said band which has been subjected to recording in the recorder, which part of said band is bounded by a line passing through said modified area parallel to the direction of movement of the band in the recorder, and a reading member adapted to determine the dimension, in a direction parallel to the axis of the drum, of said modified area formed on said part of said band rotated by the drum.

4. A spectrometer according to claim 3, wherein said reading member comprises a closed casing containing a photoelectric cell and provided on one of its faces with a slot, said casing being disposed so that its slot is very near to the peripheral surface of said rotary drum and so that its slot is parallel to the axis of rotation of said drum, and lighting means for lighting said part of said band when it passes in front of said slot, so that said photoelectric cell measures the quantity of light which is reflected by said band and whose variations reproduce the variations of the dimension of said modified area in a direction parallel to the axis of rotation of said drum.

5. A spectrometer according to claim 3, wherein said means for adding the periodic signal to the interferogram comprise a saw tooth voltage generator connected in series between the output of said interferometer and the input of said recorder.

6. A spectrometer according to claim 3, wherein said reading member operates by transmission of the light through said surface which has come from said recorder, a source of light and a detector of light being respectively placed facing each other but on opposite sides of said surface.

7. A spectrometer according to claim 2, wherein said surface is covered with a photographic emulsion and said modified area is obtained by forming on said surface the image of a luminous slot whose height varies in the same manner as the amplitude of the interferogram.

8. Spectrometer according to claim 2, comprising means to eliminate a certain proportion of successive interferograms sent in the form of a periodic succession of signals to the wave analyzer, so as to increase the number of separate spectral lines defining the infrared spectrum, to facilitate the continuous tracing of the spectrum in automatic manner.

9. Spectrometer according to claim 8, wherein said means to eliminate a certain portion of the interferograms are constituted by a crenel borne by said opaque disc in its maximal apodisation zone (of maximal vector radius), means to separate in the output signal of the said detector means the signal due to the crenel from the apodisation signal due to the eccentricity of the opaque disc, a multivibrator, of which the 0 and 1 states are synchronized by the separate signal corresponding to the crenel and have durations respectively equal to the duration of one reading and to the duration of ($n - 1$) readings and a mixer or gate receiving at its signal input the signal corresponding to the apodisation and at its control input the output of the multivibrator, this mixer only transmitting to the wave analyzer the signal applied at its signal input and when its control input if fed by the crenels corresponding to the state 0 of the flip-flop.

10. Spectrometer according to claim 2 including a second reading device capable of analyzing a reference interferogram previously recorded by the recorder of a second disc, the two discs of the two reading devices rotating in synchronism, and a wave analyzer with two paths controlled by a single heterodyne oscillator to preserve perfect equality of the analysis frequencies, the outputs of the two paths being applied on a ratio recorded or on a divider follower by a conventional recorder.

11. Spectrometer according to claim 2, in which the recording takes place on a photographic emulsion borne by an opaque support, especially on a photosensitive positive, on paper, of the flat-film type, by means of a slit of length variable as a function of the electrical signal delivered by the receiver from the interferometer and from a first light source, and the reading by reflection from a second light source on the recorded flat film, characterized by the fact that it comprises means associated with the reading device to analyze, on a recording, equal areas successively black or not black and to deduct therefrom a possible correctional signal.

12. An assembly for use in combination with an interferometer for measurement of far infrared radiation as in claim 1 wherein said surface rotating at a first regular speed is a disc.

13. A method for obtaining the spectrogram of far infrared radiation, comprising producing an interferogram of said radiation, recording said interferogram on a support rotating at a first regular speed, reading a parameter of said recording periodically at a speed much greater than said first regular speed, transforming it into a series of periodic signals representative of said parameters, and feeding said series of signals, to a wave analyzer to form said spectrogram, wherein said series of periodic signals is multiplied by an apodisation signal having the same period as said series varying steadily from a predetermined maximum value for a central peak of the interferogram to zero at junctions between successive interferograms.

14. A spectrometer, comprising, interferometer means for measurement of far infrared radiation, an assembly comprising a receiver arranged to convert the infrared interferogram produced in the interferometer to an electrical signal proportional to the intensity of the interferogram, recording means arranged to record on a surface rotating at a first regular speed a modified area having a parameter which varies as a linear function of the amplitude of the said electrical signal, the period of the rotation of said surface being equal to the duration of the transmission of the complete interferogram in the form of said electrical signal, reading means arranged to analyze periodically said parameter of said area, said reading means rotating at a second regular speed much greater than said first regular speed, thereby supplying a periodic series of electrical signals each representative of said parameter of a portion of the interferogram, and a wave analyzer adapted to analyze said series of signals and to extract components therefrom each corresponding in amplitude and in frequency to radiation of a given frequency from the source, and further comprising means to eliminate a certain proportion of successive interferograms sent in the form of a periodic succession of signals to the wave analyzer, so as to increase the number of separate spectral lines defining the infrared spectrum and facilitate the continuous tracing of the spectrum in an automatic manner.

* * * * *